Patented Aug. 7, 1928.

1,679,548

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

ART OF VULCANIZING RUBBER.

No Drawing. Application filed February 12, 1926. Serial No. 87,950.

My invention relates to the art of manufacturing vulcanized rubber compositions and it has particular reference to the employment of a class of chemical compounds that accelerate the process of vulcanization.

The object of the invention is to provide a new class of chemical compounds that are capable of accelerating the vulcanization reactions and imparting desirable physical properties to the vulcanizate.

A generic class of chemical compounds embodying a thiazole group as a part of their structure is disclosed in the patent to Sebrell and Bedford, No. 1,544,687, July 5, 1925. These compounds, particularly those having a mercapto group joined to the thiazole ring, indicated under approved nomenclature as 2-mercapto-thiazole, have been found to be excellent accelerators. Structurally the group is written:

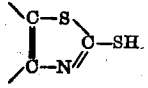

A specific compound of this class is 2-mercapto-benzo-thiazole:

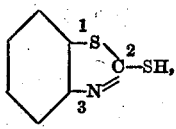

which may be regarded as a species of the sub-generic class of thiazoles designated as mercapto-aryl-thiazoles.

The present invention has reference to certain modifications or derivatives of the subgenus of mercapto-aryl-thiazoles, and it relates particularly to the reaction products obtained by substitution in, or addition to, the aryl portion of the structure. An example of this class is 6-nitro-2-mercaptobenzo-thiazole:

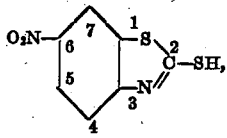

prepared by treating 2-mercapto-benzo-thiazole with concentrated nitric acid. This compound, wherein a nitro group is substituted in the aryl nucleus, is typical of a large number of acid forming substances that include also the halogenated and sulphonated derivatives, together with the hydroxyaryl derivatives.

If 6-nitro-2-mercapto-benzo-thiazole be subjected to the action of a suitable agent, such as tin and hydrochloric acid, the nitro or acid forming group is reduced to form a corresponding amido compound, that also possesses desirable accelerating properties. The isomeric compound, 5-amido-2-mercaptobenzothiazole, may be mentioned as another example, that is prepared conveniently by treating 2-4-2'-4'-tetra-amidophenyldisulfide with carbon bisulfide and sodium hydrosulfide. All of these compounds possess desirable qualities as accelerating agents.

Other materials which fall within the broad scope of my invention are the condensation products which result when certain of the reaction products such as the amido aryl derivatives are permitted to interact with aldehydes, aldols or similar materials. An example of this is the condensation product of benzaldehyde with 6-amido-2-mercaptobenzothiazole. The degree of condensation which the material is permitted to undergo is not a limitation of my invention nor are the exact proportions employed material in determining its premise. Further modifications of the several species of materials which are set forth as a part of my invention include the metallic salts; moreover the tolyl (methyl phenyl) xylyl, naphthyl as well as other groups, that are known to be equivalents of the phenyl group may be substituted therefor.

The propriety, of referring to group

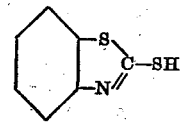

as 2-mercaptobenzothiazole, may be questioned, inasmuch as two adjacent carbon atoms are common to both the benzene and the thiazole rings. However, the nomenclature has been recognized in the literature, and it is to be understood, with reference to this application, that the species, benzothiazole, is considered to fall within the subgenus of arylthiazoles.

The relative effects upon the vulcanizate of certain specific accelerators falling within the class described herein, will be apparent from the following table of physical tests.

In each case, the mix was made according to the following formula:

100 parts rubber, 5 parts ZnO, 3 parts sulfur, 0.5 parts accelerator.

| Accelerator | Time of cure, steam pressure 20 lbs. gauge | Tensile strength kgs/cm² | Elongation, per cent |
|---|---|---|---|
| | Hrs. Min. | | |
| 5-chlor-2-mercaptobenzothiazole | 40 | 155 | 845 |
| 6-nitro-2-mercaptobenzothiazole | 1 40 | 110 | 815 |
| 5-chlor-6-nitro-2-mercaptobenzothiazole | 1 20 | 90 | 860 |
| 6-amido-2-mercaptobenzothiazole | 2 00 | 90 | 830 |
| Zinc salt of 6-nitro-2-mercaptobenzothiazole | 1 00 | 120 | 780 |
| Lead salt of 6-nitro-2-mercaptobenzothiazole | 2 00 | 80 | 865 |
| 6-nitro-benzothiazoledisulfide | 1 40 | 120 | 840 |
| Zinc salt of 5-chlor-6-nitro-2-mercaptobenzothiazole | 1 20 | 105 | 870 |
| 2-mercapto-6-amido-5-chlor benzothiazole | 1 20 | 135 | 860 |
| 2-mercapto-6-amido benzothiazole benzaldehyde | 1 20 | 135 | 855 |

While it has been set forth briefly how a few of the accelerating compounds may be prepared and utilized, it will be understood that the invention does not contemplate the method of preparation, but only the utilization of the products as accelerators of vulcanization. For this reason, any well-known or improved method may be employed.

Although the specific examples have been limited to compounds wherein acid forming elements are substituted directly or in combination with other elements in a particular position on the aryl group, the invention is not to be so limited, inasmuch as the compounds formed by substitution or addition in other positions with respect to the adjacent carbon atoms of the thiazole ring, fall within the principles described herein. It will be apparent to those skilled in the art that various other modifications may be resorted to without departing from the spirit of the invention, which should be limited, therefore, only as indicated by the scope of the following claims.

What I claim is:

1. A method of accelerating the vulcanization of caoutchouc that comprises vulcanizing the same in the presence of a mercapto-aryl-thiazole whose aryl structure contains an amido group.

2. A method of accelerating the vulcanization of caoutchouc that comprises vulcanizing the same in the presence of a mercapto-amido-thiazole.

3. A method of accelerating the vulcanization of caoutchouc that comprises vulcanizing the same in the presence of a mercapto-amido-benzo-thiazole.

4. A caoutchouc product that has been vulcanized in the presence of a mercapto-aryl-thiazole whose aryl structure contains an amido group.

5. A caoutchouc product that has been vulcanized in the presence of a mercapto-amido-thiazole.

6. A caoutchouc product that has been vulcanized in the presence of a mercapto-amido-benzo-thiazole.

7. A caoutchouc product that has been vulcanized in the presence of the reaction product of mercapto-amido-benzo-thiazole.

8. A method of treating caoutchouc which comprises vulcanizing it in the presence of a mercapto-aryl-thiazole, in which at least one of the hydrogen atoms of the aryl group has been replaced by a non-metallic substance.

9. A method of treating caoutchouc which comprises vulcanizing it in the presence of an aryl-thiazole in which at least one of the hydrogen atoms of the aryl group has been replaced by a nitrogen atom.

In witness whereof, I have hereunto signed my name.

LORIN B. SEBRELL.